United States Patent [19]

Steele et al.

[11] Patent Number: 5,562,949

[45] Date of Patent: * Oct. 8, 1996

[54] LOW SOLIDS HYDROPHILIC COATING

[75] Inventors: John W. Steele, Torrington; Timothy R. Boysen, Colchester, both of Conn.

[73] Assignee: United Technologies Corporation, Hartford, Conn.

[*] Notice: The portion of the term of this patent subsequent to Mar. 16, 2014, has been disclaimed.

[21] Appl. No.: 213,983

[22] Filed: Mar. 16, 1994

[51] Int. Cl.$^6$ ............... B05D 1/00; C09D 5/14; F28F 19/02
[52] U.S. Cl. ............... 427/397.7; 106/15.05; 106/286.8; 106/287.1; 106/287.34; 165/133; 427/420; 427/421; 427/427; 427/236; 427/239
[58] Field of Search ............... 106/15.05, 287.1, 106/287.34, 286.8; 427/421, 427, 397.7, 236, 239, 420; 165/133

[56] References Cited

U.S. PATENT DOCUMENTS

| 3,658,581 | 4/1972 | Paul et al. | 427/379 |
| 3,868,830 | 3/1975 | Fletcher et al. | 62/290 |
| 5,264,250 | 11/1993 | Steele et al. | 427/380 |
| 5,305,827 | 4/1994 | Steele et al. | 106/15.05 |

FOREIGN PATENT DOCUMENTS

| 0083867 | 7/1983 | European Pat. Off. . |

*Primary Examiner*—Anthony Green
*Attorney, Agent, or Firm*—Mary R. Bonzagni, Esq.; Holland & Bonzagni, P.C.

[57] ABSTRACT

Optionally antimicrobial, hydrophilic coatings having reduced or low solids contents are provided. Such coatings are extremely useful for coating heat transfer surfaces of condensing heat exchangers to provide wetting and wicking and optionally to provide microbial growth inhibition where such coatings have improved coating properties and are, upon cure, less prone to cracking, flaking and particle generation.

12 Claims, 1 Drawing Sheet

5,562,949

LOW SOLIDS HYDROPHILIC COATING

BACKGROUND OF THE INVENTION

1. Field of the Invention

The present invention relates in general to hydrophilic coatings and, more particularly, to optionally antimicrobial, hydrophilic coatings having reduced or low total solids contents.

2. Description of Related Art

Condensing heat exchangers for micro or zero gravity applications rely on hydrophilic and antimicrobial, hydrophilic coating systems to "wet out" condensed water for subsequent collection. In particular, the antimicrobial, hydrophilic coating systems inhibit microbial proliferation and cause wetting and wicking, thereby inducing condensate in the condenser to form a thin spreading film in the coating that can readily be collected. This thin film is collected through "slurper" holes into a gas-liquid phase separator which keeps water droplets from being entrapped in the gaseous stream from which it was removed. (See U.S. Pat. No. 3,868,830.)

U.S. Pat. No. 3,658,581 to Paul et al., which is incorporated herein by reference, discloses a high solids hydrophilic passive coating which facilitates wetting and wicking on heat transfer surfaces. The hydrophilic qualities of this coating result from the chemical polarity of uncoated silica or calcium silicate dispersed in a non-crystalline binder and from the capillary attraction of the water molecules for one another. The silica and calcium silicate particles have a polar attraction to hydroxyl ions in the condensate water and thereby pull the water to the coating, known as wetting. Wicking or capillary attraction then comes into play as the water being drawn into the coating pulls additional water along with it.

Due to the high solids content of the Paul et al. hydrophilic coating, application of the coating can be difficult and time consuming. In addition, after the coating is heat cured, it is highly susceptible to cracking, flaking and subsequent particle generation. A preferred slurry formulation of Paul et al. comprises: 125 parts by weight silica; 12 parts by weight zinc oxide; 222 parts by weight potassium silicate; and 500 parts by weight water. (See Column 1, lines 52 to 57.) Another preferred slurry formation disclosed in Paul et al. comprises: 100 parts by weight silica; 100 parts by weight lead borosilicate glass frit; 5.8 parts by weight boric acid; 5.2 parts by weight potassium hydroxide; 3.9 parts by weight sodium silicate; and 150 parts by weight water. (See Column 2, lines 24 to 40.) These slurries deposit a relatively thick (1 to 10 mil) coating that tends to "pool" and deposit, by dip application and cure (as hereinafter defined), approximately 23 to 28 milligrams (mg) of cured coating per square inch ($in^2$) of coated or dipped material. The tendency of these slurries to "pool" is magnified when coating hardware with a constrained geometry. As a result, the Paul et al. coating, after heat cure, is prone to cracking, flaking and particle generation. By way of example, prior Space Shuttle Temperature and Humidity Control Fan Separator failure analyses have attributed water separator flooding and water carry over anomalies to plugging of the water separator pitot tube with hydrophilic coating particles generated from the upstream condensing heat exchanger. With longer term missions on the horizon, the elimination or reduction in the need for system maintenance is required. Temperature and Humidity Control System downstream contamination would be extremely detrimental for an extended mission since routine maintenance would be the primary way to circumvent downstream water separator flooding and water carry over anomalies.

In addition to the above, the application of such a high solids slurry must be accomplished within a very short time period (approximately 15 minutes) so as to avoid excessive agglomeration and settling of the slurry solids. In a recent coating episode of a Space Station predevelopment condensing heat exchanger the inability to accomplish the coating procedure within the noted time period led to a deposited solid plug of hydrophilic coating which impeded air flow through the heat exchanger and which lead to costly and time consuming rework.

Moreover, due to the porous characteristics of the Paul et al. coating it can potentially entrap organic, inorganic and microbial contaminants. As a result, the coated heat transfer surfaces, during extended periods of operation, constitute ideal locations for microbial proliferation which can reduce the hydrophilic properties of the coating, plug slurper holes, and corrode the heat transfer surfaces, thereby decreasing the heat transfer efficiency of the condenser. Additionally, if these microbes become air borne, they can be inhaled and cause adverse health effects and they can result in odor generation in the gaseous stream exiting the condenser. As a result, microbial proliferation can lead to heat transfer reduction, along with health and comfort concerns in relation to condensers, especially condensers which operate within a closed environment.

Since the Paul et al. coating has generally only been utilized for about 7 to 10 consecutive days, microbial proliferation has not been a great concern. After use, these condensers and the heat transfer surfaces would dry, thereby inhibiting microbial proliferation. However, in applications where the condenser will be utilized for extended periods of time, such as on a space station for 10 years or more, microbial proliferation becomes a major concern.

U.S. Pat. No. 5,264,250 to Steele et al., which is also incorporated herein by reference, partially addresses the problems associated with the Paul et al. coating. In particular, Steele et al. disclose a coating having hydrophilic and biocidal characteristics. However, the Steele et al. coating, like the coating disclosed in Paul et al., has a high solids content. In particular and as set forth above, preferred slurry formations disclosed in Steele et al. deposit, by dip application and cure, approximately 23 to 28 mg of cured coating per square inch of the coated or dipped material.

It is therefore an object of the present invention to provide a low solids, optionally antimicrobial, hydrophilic coating having improved coating properties.

It is another object of the present invention to provide a low solids, optionally antimicrobial, hydrophilic coating that, upon cure, is less prone to cracking, flaking and particle generation.

It is a further object to provide a condensing heat exchanger whose heat transfer surfaces are coated with a low solids, optionally antimicrobial, hydrophilic coating.

It is yet a further object to provide a method for coating heat transfer surfaces of a condensing heat exchanger with a low solids, optionally antimicrobial, hydrophilic coating.

SUMMARY OF THE INVENTION

The present invention therefore relates to a low solids, optionally antimicrobial, hydrophilic coating. The coating, in the form of a slurry (a stage of preparation further described below), comprises: an adhesive agent; an insolubilizer for insolubilizing the adhesive agent; an inorganic compound selected from the group including silica, calcium silicate, and mixtures thereof; optionally, an antimicrobial agent; and water or a water-based solvent, and deposits on a material, by dip application and cure, less than about 8 mg of cured coating per square inch of coated or dipped material.

The present invention also relates to a condensing heat exchanger whose heat transfer surfaces are coated with the low solids, optionally antimicrobial, hydrophilic coating described hereinabove.

The present invention further relates to a method for coating heat transfer surfaces of a condensing heat exchanger with the coating described hereinabove. The method comprises the steps of: flowing or spraying the coating in the form of a slurry through the condensing heat exchanger and allowing the slurry to intimately contact and coat the heat transfer surfaces; and heating the coated heat transfer surfaces to dry and cure the slurry.

The foregoing and other features and advantages of the present invention will become more apparent from the following description and accompanying drawings.

DETAILED DESCRIPTION OF THE INVENTION

Figure 1:
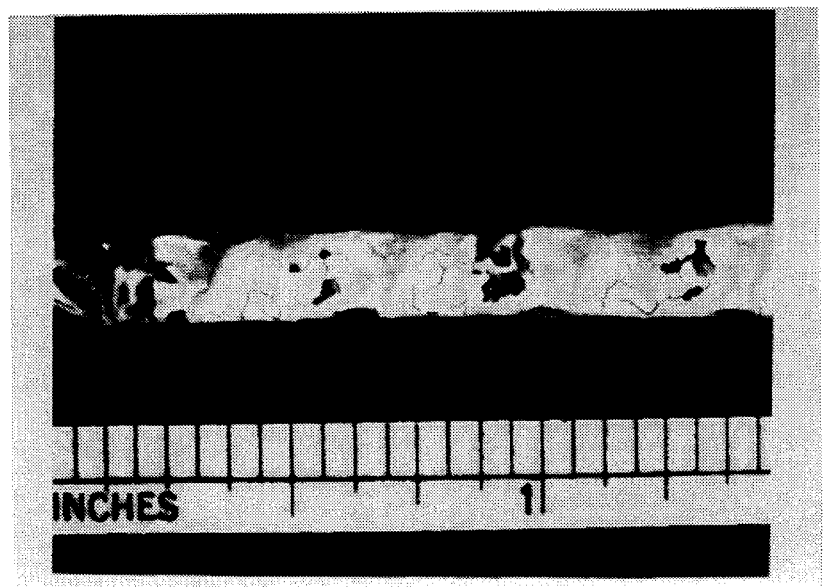
FIG. 1 is a photograph of an edge of a test panel coated with a prior art coating formulation.

Although the present inventive low solids, optionally antimicrobial, hydrophilic coating will be described herein in reference to coating heat transfer surfaces in a condenser, it is not limited thereto. This coating can be utilized on any surface in which wetting and wicking, and optionally, the inhibition of microbial proliferation, are desired.

The inorganic compound of the present inventive coating increases the surface energy of the heat transfer surfaces in a condenser and thereby provides the hydrophilic characteristics of the coating. In particular, the inorganic compound provides a very high surface energy or polarity to the coating, inducing an "attraction" for anions such as hydroxyl ions. As a result, this polar surface causes a low interfacial energy between the condensate and the heat transfer surfaces, thereby effecting the desired wetting. After the surface is wetted, the water thereon wicks into the inherently porous coating through capillary action. The water drawn into the pores of the coating draws other water molecules into the coating through inter-molecular attraction.

The inorganic compound must facilitate wetting, not impart a hydrophobic characteristic to the coating, have an equilibrium dissolution rate similar to other components of the coating, and have a low solubility in water. A few such inorganic compounds include uncoated silica, calcium silicate particles, and mixtures thereof.

Since this inorganic compound typically lacks structural integrity, it is combined with a binder. The concentration of the inorganic compound is, therefore, a balance between coating structural integrity and desired wetting and wicking characteristics. Inorganic compound concentrations can range from about 10.0% to about 20.0% by weight, based upon the total weight of the coating in the form of a slurry, including the inorganic compound, the binder, optionally an antimicrobial agent and water or a water-based solvent. It is preferred that the concentration of the inorganic compound range from about 13.0% to about 17.0% by weight and more preferably range from about 15.0% to about 16.0% by weight.

It is further preferred that the inorganic compound have an average particle size of from about 6 to about 14 microns, with about 8 to about 10 microns especially preferred. Particle sizes within these ranges increase slurry life, decrease separation of the components of the slurry, and simplify mixing of the slurry.

The binder is made up of a combination of an adhesive agent and an insolubilizer. The binder provides structural integrity to the coating by binding it together, and good adherence to and uniformity of coverage of the heat transfer surfaces.

The adhesive agent used in the binder actually provides the structural integrity to the coating by binding the coating together and preventing flaking and cracking. This adhesive agent provides structural integrity without adversely affecting the hydrophilic properties of the coating. Typically, the adhesive agent is potassium silicate, lead borosilicate glass frit, or mixtures thereof. One such adhesive agent is Kasil® #1, produced by Philadelphia Quartz Co., Philadelphia, Pa. Kasil® #1 contains 20.8% by weight silica, 8.3% by weight potassium oxide, balance water. U.S. Pat. No. 5,264,250 to Steele et al. at Column 3, line 50 reports that the concentration of adhesive agent, based upon the total weight of the slurry, should be between about 20 wt % and about 30 wt % where it is believed by Steele et al. that greater than about 40 wt % adhesive agent will adversely effect the hydrophilic abilities of the coating, while concentrations less than about 15 wt% will show poor structural integrity. However, it has been demonstrated that coatings comprising as low as 10% by weight adhesive agent will not show poor structural integrity. Accordingly, the preferred concentration of adhesive agent, based upon the total weight of the slurry, in the present invention, is from about 10% to about 30% by weight and the more preferred concentration is from about 18% to about 27% by weight.

During preparation of the present inventive coating, the adhesive agent is generally in the form of a water soluble material. As a result, coating preparation requires conversion of the adhesive agent from a water soluble material to a water insoluble material with a water insolubilizer which does not adversely effect the coating. As with the inorganic compound, the insolubilizer preferably has an average particle size of from about 6 to about 14 microns, with about 8 to about 10 microns especially preferred due to improved slurry life and simplified slurry preparation.

Possible insolubilizers include silicofluorides ($SiF_6$) of sodium, potassium, barium, manganese, and mixtures thereof, and inorganic oxides such as zinc oxide, among others. One such inorganic oxide is Kadox® 15, 99% pure zinc oxide, produced by New Jersey Zinc Co., Ogdensborg, N.J. Particularly with the silicofluoride insolubilizers, sodium hydroxide can be used as a colloidal dispersant. U.S. Pat. No. 5,264,250 to Steele et al. implies that insolubilizer concentrations of less than 10% by weight, based upon the total weight of the slurry, would not perform well. However, it has been demonstrated that insolubilizer concentrations as low as 3% by weight effectively convert the adhesive agent in the present inventive coating from a water soluble material to a water insoluble material. Accordingly, the preferred concentration of insolubilizer, based upon the total weight of the slurry, of the present invention, is from about 3 to about 10% by weight and the more preferred concentration is from about 4 to about 8% by weight.

Typically, during preparation of the present inventive coating, the inorganic compound is combined with the binder in a solvent that does not adversely effect the final coating, to form a slurry. This solvent is typically water or a water-based solvent. The solvent concentration generally ranges from about 30% to about 70% by weight with between about 40% to about 60% by weight preferred, based upon the total weight of the slurry.

In accordance with the above, the preferred slurry formulation for the low solids hydrophilic coating of the present invention comprises:

a. from about 10% to about 30% by weight of an adhesive agent;

b. from about 3% to about 10% by weight of an insolubilizer for insolubilizing the adhesive agent;

c. from about 10% to about 20% by weight of an inorganic compound selected from the group including silica, calcium silicate, and mixtures thereof; and d. from about 30% to about 70% by weight of water or a water-based solvent, where the sum of the components is 100% by weight, based on the total weight of the slurry.

The low solids, hydrophilic coating of the present invention may further include an antimicrobial agent which provides biocidal characteristics to the coating. In order to prevent microbial proliferation, especially during longer term space missions, the antimicrobial agent is preferably a substance which slowly dissolves into the condensate and inhibits microbial growth by attacking the cellular DNA of microorganisms. For example, if silver oxide is utilized as the antimicrobial agent, it slowly dissolves into the condensate in the form of silver ions. The silver ions diffuse through the cell walls of the microbes and complex with the cellular DNA therein. This complex formation interrupts the normal role of DNA and thus prevents reproduction of the microbe. Conventional biocides which do not interfere with the hydrophilic characteristics of the coating and which have an equilibrium dissolution rate similar to that of the inorganic compound and binder can be employed. If the antimicrobial agent dissolves into the condensate at a faster rate than the inorganic compound and the binder, pitting can occur in the coating, thereby reducing the hydrophilic characteristics and structural integrity thereof and the heat transfer efficiency of the condenser.

Possible antimicrobial agents include salts such as arsenic salts, iodine salts, iron salts, mercury salts, silver salts, tin salts, and mixtures thereof, with mercury salts and silver salts preferred. Silver salts are especially preferred. A silver salt which has proven particularly useful as an antimicrobial agent having an appropriate equilibrium dissolution rate is silver oxide, which can be purchased from Mallinckrodt Co., Paris, Ky., in a purified powder form.

It has been observed that silver oxide not only acts as an antimicrobial agent which does not inhibit the hydrophilic characteristics of the coating, it additionally improves the adhesive properties of the coating to heat transfer surfaces. It has also been observed that silver oxide levels of about 1.0% by weight and greater can adversely effect the hydrophilic characteristics of the coating and that silver oxide levels below about 0.1% by weight will exhibit only minimal biocidal properties. (See Column 4, lines 64 to 68 of Steele et al.) However, it has been demonstrated that antimicrobial agent concentrations as high as 1.5% by weight do not inhibit the hydrophilic characteristics of the coating. Accordingly, the preferred concentration of the antimicrobial agent, based upon the total weight of the slurry of the present invention, is from about 0.3% to about 1.5% by weight and the more preferred concentration is from about 0.8% to about 1.2% by weight.

As with the inorganic compound and the insolubilizer, the antimicrobial agent preferably has an average particle size of from about 6 to about 14 microns, with about 8 to about 10 microns especially preferred. As stated above, particle sizes in this range increase the slurry life, components do not separate out as quickly, and the slurry is easier to mix.

In accordance with the above, the preferred slurry formulation for the low solids, antimicrobial, hydrophilic coating of the present invention comprises:

a. from about 10% to about 30% by weight of an adhesive agent;

b. from about 3% to about 10% by weight of an insolubilizer for insolubilizing the adhesive agent;

c. from about 10% to about 20% by weight of an inorganic compound selected from the group including silica, calcium silicate, and mixtures thereof;

d. from about 0.3% to about 1.5% by weight of an antimicrobial agent; and e. from about 30% to about 70% by weight of water or a water-based solvent, where the sum of the components is 100% by weight, based upon the total weight of the slurry.

In preparing the present inventive coating, the slurry components are mixed until essentially homogenous and then preferably utilized before the components aggregate or agglomerate and settle creating component rich and component devoid areas in the coating. Unlike prior art coatings, the time period during which the present inventive coating, in the form of a slurry, may be applied is approximately 30 minutes. Steele et al. caution, at Column 5, lines 20 to 25, that their slurry should be utilized within approximately 15 minutes of mixing.

Application of the coating, in the form of a slurry, to heat transfer surfaces can be accomplished in various manners, all of which are conventional. These conventional processes included dipping, spraying, and painting the heat transfer surfaces with the slurry, flowing the slurry through the condenser and allowing it to remain a sufficient period of time to coat the heat transfer surfaces, and other common coating techniques. Where the present inventive coating, in the form of a slurry, has a reduced or low total solids content, it flows into and out of difficult geometries much more readily, thereby minimizing scrap hardware generated during faulty processing. In addition, the low solids slurry deposits approximately ¼ of the solids of prior art coatings. As a result, the cured coating is, in general, thinner and less susceptible to cracking and flaking and subsequent particle generation and the resulting coated surface is lighter. Such a coating, in regard to heat exchangers, will allow for improved heat transfer since the generally thinner coating will result in less effect on the transfer of heat therethrough.

It has been demonstrated that the thickness of the coating does not effect the hydrophilic and antimicrobial characteristics thereof. However, in a condenser, coating thicknesses above about 500 microns, can adversely effect the heat transfer ability, of the heat transfer surfaces, due to plugging and prevention of water flow. Coating thicknesses less than about 100 microns, may decrease the life of the coating, since the coating slowly dissolves into the water. Accordingly, for the coating on heat transfer surfaces, formed by the flow through method, the coating thickness typically ranges from about 100 to 500 microns.

Once the coating has been applied it must be dried and cured. Ultimately, complete removal of the water or water-based solvent and complete curing of the coating is desired. Various manners of accomplishing water or water-based solvent removal and curing include the use of a vacuum, flowing dry air over the coating, and heating the coating to a temperature which will induce curing without sintering, or conventional water or water-based solvent removal and curing techniques. Since water evaporates at 100° C., if the temperature of the coating is rapidly raised to above about 110° C., the water will rapidly vaporize thereby causing cracks and flaking in the coating. As a result, it is preferred to slowly raise the temperature of the coating to about 260° C. either sequentially or very slowly over a period of about 1 to about 6 hours. Sequential curing can consist of between 2 and 8 sequential temperature steps or more, the first sequence remaining below about 100° C. for about 1.0 to about 3.0 hours and a final step at about 260° C. for between about 1.0 to about 4.0 hours with possible steps in between.

One possible curing sequence includes heating the coating to a range of about 79° C. to about 85° C. for between about 0.25 and about 1.0 hours, to a range of about 91° C. to about 96° C. for between about 0.5 and about 1.5 hours, to a range of about 102° C. to about 107° C. for between about 0.25 and about 1.0 hours, to a range of about 118° C. to about 124° C. for between about 0.25 and about 1.0 hours, to a range of about 146° C. to about 152° C. for between about 0.5 and about 1.5 hours, and to about 260° C. for between about 1.5 and about 2.5 hours. Another possible curing sequence comprises slowly, over a period of about 2.0 hours, raising the temperature of the coating to between about 93° C. and about 102° C., then increasing the temperature to about 260° C. over a second period of about 2.0 hours, and finally maintaining the temperature at about 260° C. for about 2.0 hours.

The term "dip application and cure", as used herein, is intended to mean a method for coating a material comprising the steps of:

1. dipping the material in a coating, in the form of a slurry (within fifteen (15) minutes of preparing the slurry, for prior art slurries and within thirty (30) minutes of preparing the slurry of the present invention) for three (3) seconds and repeating the dipping procedure at least five (5) times until a uniform coating results;
2. drying the coated material for at least sixteen (16) hours in a closed container at room temperature at 100% humidity; and
3. curing the dried coating by slowly or sequentially raising the temperature of the coating on the coated material to at least about 255° C. over a period of about one (1) to about six (6) hours.

The present invention will be clarified by reference to the following illustrative examples. The examples are not, however, intended to limit the generally broad scope of the present invention.

SPECIFIC EMBODIMENT

In the working examples set forth below, the following components were used:

ADHESIVE AGENT—a mixture of 20.8% by weight silica, 8.3% by weight potassium oxide, balance water, available from Philadelphia Quartz Co., Philadelphia, Pa, under the product designation Kasil® #1.

INSOLUBILIZER—99% pure zinc oxide available from New Jersey Zinc Co., Ogdensborg, N.J., under the product designation Kadox® 911.

INORGANIC COMPOUND—silica flour grade A-45 amorphous, available from Illinois Mineral Co., Cairo, Ill., under the product designation Silica Amorphous Grade 1160.

ANTIMICROBIAL AGENT—99.0% pure powdered silver oxide (avg. particle size=3 microns), available from Mallinckrodt Co., Paris, Ky., under the product designation Purified Silver Oxide Powder.

WATER—distilled water.

SAMPLE PREPARATION

1. Slurry Preparation.

Three types of slurry formulations were prepared. Slurry formulation type "A", as used hereinbelow, identifies a prior art formulation as disclosed and claimed in U.S. Pat. No. 5,264,250 to Steele et al. Slurry formulation type "B", as used hereinbelow, identifies the present inventive antimicrobial hydrophilic coating Slurry formulation type "C", as used herein, identifies the present inventive hydrophilic coating. The coating components referenced above were mixed, in the following proportions, in a Waring Model CB-56, one gallon size, three speed commercial type blender, on low speed, for 20 seconds:

|  | Slurry Formulation Type | | |
|---|---|---|---|
| Component | "A" | "B" | "C" |
| ADHESIVE AGENT (grams (g)) | 876 | 890 | 890 |
| INSOLUBILIZER (g) | 448 | 192 | 192 |
| INORGANIC COMPOUND (g) | 500 | 500 | 500 |
| ANTIMICROBIAL AGENT (g) | 17.6 | 35.2 | — |
| WATER (g) | 1600 | 1600 | 1600 |

For each prepared slurry formulation type, the ADHESIVE AGENT was added to the WATER first, followed by the addition of the INORGANIC COMPOUND and the INSOLUBILIZER. The ANTIMICROBIAL AGENT, in slurry formulation types "A" and "B", was added to the formulation after the addition of the INSOLUBILIZER and before mixing.

2. Test Panel and Heat Exchanger Module Preparation.

Six (6) test panels manufactured from 347 Stainless Steel and measuring 2×2×1/16 inch were weighed and then each set of two (2) panels coated with a different slurry formulation type. Four (4) heat exchanger modules manufactured from aluminum and measuring 6×1.5×1.5 inch were also weighed and then each set of two (2) modules were coated with either slurry formulation type "A" or "B". The test panels and modules (test specimens) were coated by dipping the specimen for three (3) seconds into the slurry formulation and repeating the dipping procedure six (6) times until a uniform coat resulted. Slurry formulation type "A" was used within 15 minutes of mixing while slurry formulation types "B" and "C" were used within 30 minutes of mixing. Excess coating was removed from each test panel and module by dabbing the bottom of each test specimen on a clean paper towel.

Each coated test specimen was then placed in a clean sealed container and dryed or cured at room temperature at 100% humidity for sixteen (16) hours. The panels and modules were then removed from the containers, placed in a Class B convection oven and cured according to the following schedule:

0.5 hours±5 min. at 82 ±5° C.

1.0 hours±5 min. at 93 ±5° C.

0.5 hours±5 min. at 104 ±5° C.

0.5 hours±5 min. at 121 ±5° C.

1.0 hours±5 min. at 149 ±5° C.

2.0 hours±5 min. at 260 ±5° C. The test panels and modules were then allowed to cool to 60° C. and weighed. The cured coating weight per unit area of each test panel was then determined by taking the difference between the panel weight before coating and the panel weight after cure and dividing that quantity by 8 (the total square inches of each 2 inch×2 inch panel).

TEST METHODS

The prepared test panels were then subjected to the following tests:

WETTABILITY CHECK—A circle that measured 0.5±0.05 inches in diameter was lightly drawn with pencil on each coated test panel. A 5±0.2 microliter drop of deionized water, using a 10 micro-liter syringe, was then placed in the center of each circle and the time to cover the circled area was recorded.

WETTABILITY SPREAD—For each coated test panel subjected to the WETTABILITY CHECK described immediately hereinabove, the maximum diameter of the area wetted by the 5±0.2 microliter drop of deionized water was measured and recorded when no change in the area was noted for a period of 30 sec.

ADHESION CHECK—As discussed hereinabove, each test panel was weighed prior to coating to ±0.0001 g (X), and reweighed after coating and curing (Y). A length of 0.5 inch wide tape (Scotch Brand Magic Tape, 3M Catalog Number 102) was then applied to the entire length of each test panel using normal finger pressure. The tape remained on each panel for 60 seconds and was then removed by pulling one end at approximately a 90° angle to the panel. Each panel was then reweighed to ±0.0001 g (Z). The present weight loss was calculated by the following formula: % weight loss=((Y−Z)/(Y−X))×100.

The prepared heat exchanger modules were then subjected to the following test:

VIBRATION TEST—Each module was tested for particulate generation by placing each module in a plastic bag to retain generated particulates. Each module was then separately and rigidly mounted on a vibration slip table using aluminum pads. Each module was then subjected to testing in three orthogonal axes (z, y, x) by first rotating the modules to the appropriate axis. Each module was then subjected to the following vibration input profile:

| Frequency (Hertz (Hz)) | Power Spectral Density (PSD) Level |
|---|---|
| 20 | 0.02 G$^2$/Hz (power ratio of G$^2$ to frequency) |
| 20–80 | +3.0 decibels (db)/octave (oct) (break in slope of vibration curve) |
| 80–500 | 0.08 G$^2$/Hz (power ratio) |
| 500–2000 | −3.0 dB/oct (break) |
| 2000 | 0.02 G$^2$/Hz (power ratio) |

The Power Spectral Density Level, as used hereinabove, constitutes a computer controlled test profile that, through the vibration slip table, subjects each module to a vibration curve that emulates a space shuttle launch. The duration of the test was 20 minutes +1%/axis.

The frequency tolerance or deviation of the input frequency was ±10%. The Overall Level or integration under the vibration curve was 9.59 G root mean square (Grms) ±10%. The Power Spectral Density (PSD) vibration curve tolerance was ±3.0 dB.

After each axis tested, the collected particulates, if any, in each bag were weighed and the weight recorded. The vibration test was then repeated until all three axes had been tested.

EXAMPLES 1 TO 3

In these examples, test panels coated with either slurry formulation type "A", "B" or "C" were tested for wettability and adhesion and the cured coating weight per unit area of each test panel determined. The results are set forth in Table I hereinbelow.

TABLE I

| SUMMARY OF EXAMPLES 1 TO 3 | | | |
|---|---|---|---|
| EXAMPLE | 1 | 2 | 3 |
| Slurry Formulation Type | "A" | "B" | "C" |
| Cured Coating Weight Per Unit Area (mg/in$^2$) | 27.5 | 7.5 | 7.0 |
| Properties: | | | |
| WETTABILITY CHECK (Seconds) | 1.5–2.0 | 1.0–1.5 | 1.5–2.0 |
| WETTABILITY SPREAD (Inches) | 11/16–14/16 | 14/16–15/16 | 15/16–18/16 |
| ADHESION CHECK (% Wt. Loss) | 0.5–1.8 | 0.6–1.7 | 1.4–2.4 |

Examples 1 to 3 demonstrate that the present inventive "low solids" coating, with or without silver oxide as an antimicrobial agent, displays adhesion and wettability properties comparable to those of the prior art "high solids" formulation.

EXAMPLES 4 TO 7

In these examples, heat exchanger modules coated with either slurry formulation type "A" or "B" were tested for particulate generation by subjecting each module to the vibration test set forth above. The results are set forth in Table II hereinbelow.

TABLE II

| SUMMARY OF EXAMPLES 4 TO 7 | | | | |
|---|---|---|---|---|
| EXAMPLE | 4 | 5 | 6 | 7 |
| Slurry Formulation Type | "A" | "A" | "B" | "B" |
| Coating Weight Before Vibration Test (g) | 7.3 | 6.8 | 4.3[1] | 1.6 |
| Properties: | | | | |
| PARTICULATE GENERATION | | | | |
| z-axis (mg) | 41.2 | 3.2 | 0 | 0 |
| y-axis (mg) | 24.4 | 0 | 0 | 0 |
| x-axis (mg) | 11.1 | 0 | 0 | 0 |

[1]Coating applied thicker than usual due to processing difficulties.

Examples 6 and 7 demonstrate that the present inventive coating, which has less total deposited solids, as compared to Examples 4 and 5, shows no observed or measurable particle generation due to vibration.

In addition to the above detailed tests, each test panel was visually examined for surface anomalies or defects within two (2) hours after cure. Such visual examination revealed that test panels coated with slurry formulation type "B" or "C" demonstrated a reduced propensity to flake and crack as compared to test panels coated with slurry formulation type "A". Such a reduced propensity can be seen in the Figures set forth herein and described below.

Figure 2:
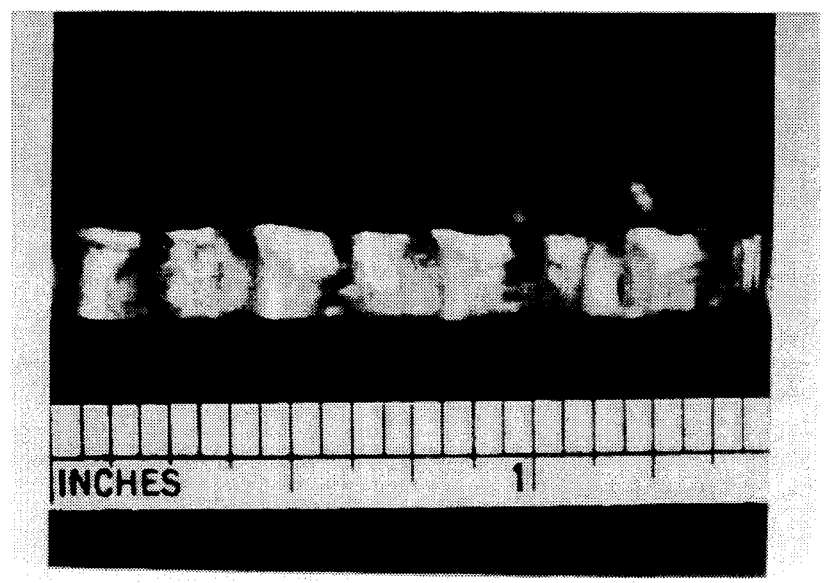
FIG. 2 is a photograph of an edge of a test panel coated with the present invention.

FIG. 1, which is meant to be exemplary not limiting, is a photograph of a test panel coated with slurry formulation type "A". FIG. 2, which is also meant to be exemplary not limiting, is a photograph of a test panel coated with slurry formulation type "B". As can be readily seen, test panels coated with the present inventive coating display less cracking, less flaking and as a result less particle generation.

The advantages of the present invention are readily apparent. These advantages make the low solids coating particularly beneficial for use in condensing heat exchangers utilized in zero or micro gravity applications for extended periods of time.

Although this invention has been shown and described with respect to detailed embodiments thereof, it will be understood by those in the art that various changes in form and detail thereof may be made without departing from the spirit of the claimed invention.

What is claimed is:

1. An optionally antimicrobial, hydrophilic coating composition, in slurry form, wherein said slurry comprises:
    a. from about 10% to about 30% by weight, based on the total weight of (a)–(e), of an adhesive agent for binding said coating composition together, wherein said adhesive agent does not adversely affect the hydrophilic properties of said coating composition;
    b. from about 3% to about 10% by weight, based on the total weight of (a)–(e), of a water insolubilizer for insolubilizing said adhesive agent;
    c. from about 10% to about 20% by weight, based on the total weight of (a)–(e), of an inorganic compound selected from the group consisting of silica, calcium silicate, and mixtures thereof;
    d. optionally, from about 0.3% to about 1.5% by weight, based on the total weight of (a)–(e), of an antimicrobial agent; and
    e. from about 30% to about 70% by weight, based on the total weight of (a)–(e), of water or a water-based solvent,
    wherein said slurry deposits on a material, by dip application and cure, less than about 8 milligrams of cured coating composition per square inch of material.

2. The optionally antimicrobial, hydrophilic coating composition of claim 1, wherein said adhesive agent is selected from the group consisting of potassium silicate, borosilicate glass and mixtures thereof.

3. The optionally antimicrobial, hydrophilic coating composition of claim 1, wherein said insolubilizer is selected from the group consisting of zinc oxide and silicofluorides of sodium, potassium, barium, manganese, and mixtures thereof.

4. The optionally antimicrobial, hydrophilic coating composition of claim 1, wherein said antimicrobial agent is a salt selected from the group consisting of arsenic salt, iodine salt, iron salt, mercury salt, silver salt, tin salt and mixtures thereof.

5. A condensing heat exchanger, said heat exchanger having heat transfer surfaces coated with an optionally antimicrobial, hydrophilic coating composition, wherein said coating composition, in slurry form, comprises:
    a. from about 10% to about 30% by weight, based on the total weight of (a)–(e), of an adhesive agent for binding said coating composition together, wherein said adhesive agent does not adversely affect the hydrophilic properties of said coating composition;
    b. from about 3% to about 10% by weight, based on the total weight of (a)–(e), of a water insolubilizer for insolubilizing said adhesive agent;
    c. from about 10% to about 20% by weight, based on the total weight of (a)–(e), of an inorganic compound selected from the group consisting of silica, calcium silicate, and mixtures thereof;
    d. optionally, from about 0.3% to about 1.5% by weight, based on the total weight of (a)–(e), of an antimicrobial agent; and
    e. from about 30% to about 70% by weight, based on the total weight of (a)–(e), of water or a water-based solvent,
    wherein said slurry deposits on a material, by dip application and cure, less than about 8 milligrams of cured coating composition per square inch of material.

6. The condensing heat exchanger of claim 5 wherein said adhesive agent of said coating composition is selected from the group consisting of potassium silicate, borosilicate glass and mixtures thereof.

7. The condensing heat exchanger of claim 5 wherein said insolubilizer of said coating composition is selected from the group consisting of zinc oxide and silicofluorides of sodium, potassium, barium, manganese, and mixtures thereof.

8. The condensing heat exchanger of claim 5 wherein said antimicrobial agent of said coating composition is a salt selected from the group consisting of arsenic salt, iodine salt, iron salt, mercury salt, silver salt, tin salt and mixtures thereof.

9. A method for coating heat transfer surfaces of a condensing heat exchanger with an optionally antimicrobial, hydrophilic coating composition, comprising:
    a. flowing or spraying said coating composition in the form of a slurry through said condensing heat exchanger, wherein said slurry intimately contacts and coats said heat transfer surfaces; and
    b. heating said coated heat transfer surfaces to dry and cure said slurry thereby forming a coating on said heat transfer surfaces,
    wherein said slurry comprises:
        a. from about 10% to about 30% by weight, based on the total weight of (a)–(e), of an adhesive agent for binding said coating composition together, wherein said adhesive agent does not adversely affect the hydrophilic properties of said coating composition;
        b. from about 3% to about 10% by weight, based on the total weight of (a)–(e), of a water insolubilizer for insolubilizing said adhesive agent;
        c. from about 10% to about 20% by weight, based on the total weight of (a)–(e), of an inorganic compound selected from the group consisting of silica, calcium silicate, and mixtures thereof;
        d. optionally, from about 0.3% to about 1.5% by weight, based on the total weight of (a)–(e), of an antimicrobial agent; and e. from about 30% to about 70% by weight, based on the total weight of (a)–(e), of water or a water-based solvent, wherein said slurry deposits on a material, by dip application and cure, less than about 8 milligrams of cured coating composition per square inch of material.

10. The method of claim 9 wherein said adhesive agent of said slurry is selected from the group consisting of potassium silicate, borosilicate glass and mixtures thereof.

11. The method of claim 9 wherein said insolubilizer of said slurry is selected from the group consisting of zinc oxide and silicofluorides of sodium, potassium, barium, manganese, and mixtures thereof.

12. The method of claim 9 wherein said antimicrobial agent of said slurry is a salt selected from the group consisting of arsenic salt, iodine salt, iron salt, mercury salt, silver salt, tin salt and mixtures thereof.

* * * * *